United States Patent
Hawtof et al.

(10) Patent No.: US 7,677,058 B2
(45) Date of Patent: Mar. 16, 2010

(54) PROCESS AND APPARATUS FOR MAKING GLASS SHEET

(75) Inventors: Daniel Warren Hawtof, Corning, NY (US); Michael Donovan Brady, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 156 days.

(21) Appl. No.: 11/800,585

(22) Filed: May 7, 2007

(65) Prior Publication Data

US 2008/0280057 A1 Nov. 13, 2008

(51) Int. Cl.
- C03B 19/01 (2006.01)
- C03B 19/06 (2006.01)
- C03B 19/14 (2006.01)
- C23C 4/00 (2006.01)
- C23C 16/00 (2006.01)

(52) U.S. Cl. .................... 65/17.4; 65/17.3; 65/144; 118/718; 427/450

(58) Field of Classification Search ............ 65/17.3; 118/718; 427/450

See application file for complete search history.

(56) References Cited

U.S. PATENT DOCUMENTS

| | | | | |
|---|---|---|---|---|
| 3,806,570 A | * | 4/1974 | Flamenbaum et al. | 264/1.21 |
| 3,844,751 A | * | 10/1974 | Stewart | 65/377 |
| 4,494,968 A | * | 1/1985 | Bhagavatula et al. | 65/386 |
| 4,735,677 A | * | 4/1988 | Kawachi et al. | 438/25 |
| 6,263,706 B1 | * | 7/2001 | Deliso et al. | 65/397 |
| 2004/0007019 A1 | * | 1/2004 | Kohli | 65/17.6 |
| 2004/0089237 A1 | | 5/2004 | Pruett et al. | 118/719 |
| 2006/0063351 A1 | | 3/2006 | Jain | 438/455 |

FOREIGN PATENT DOCUMENTS

| JP | 09-286621 A | | 11/1997 |
|---|---|---|---|
| JP | 09286621 A | * | 11/1997 |
| WO | WO2005/024908 A2 | | 3/2005 |

OTHER PUBLICATIONS

Machine translation of JP 09286621.*
GlassOnWeb. "The Achille Heel of a Wonderful Material: Toughened Glass." Nov. 2006. http://www.glassonweb.com/articles/article/330.*

* cited by examiner

Primary Examiner—Steven P Griffin
Assistant Examiner—Cynthia Szewczyk
(74) Attorney, Agent, or Firm—Michael W. Russell; Steven J. Scott; Siwen Chen (57) ABSTRACT

An apparatus and process for making glass soot sheet and sintered glass sheet. Glass soot particles are deposited on a curved deposition surface of a rotating drum to form a soot sheet. The soot sheet is then released from the deposition surface. The soot sheet can be sintered into a consolidated glass. The soot sheet and the sintered glass can be sufficiently long and flexible to be reeled into a roll.

48 Claims, 5 Drawing Sheets

PROCESS AND APPARATUS FOR MAKING GLASS SHEET

FIELD OF THE INVENTION

The present invention relates to processes and apparatus for making glass sheets. In particular, the present invention relates to a soot process for making glass soot sheet and sintered glass sheet, and apparatus for such process. The present invention is useful, for example, in making long, flexible, rollable glass sheets, such as silica glass sheets.

BACKGROUND OF THE INVENTION

Various commercial processes are available in the prior art for making glass sheet materials. Float process, as an example, involves the formation of glass sheet on a molten metal bath. This process can be used for making glass sheet material with a wide range of compositions. Another advantage of this process is the capability of achieving high surface quality on the side exposed to air. However, this process requires direct contact between the metal melt and the glass melt, which can lead to unwanted contamination of the interface and less than pristine surface quality. Thus, in order to produce high quality glass sheet with pristine surface properties on both major surfaces, glass sheet produced from the float process may need to be further surface-polished, which can be a quite expensive step. Moreover, it is believed that the float process has not been used for making thin, rollable glass ribbons.

Fusion draw process is one of the current processes for making thin glass sheet with extremely high surface quality, such as those for use as LCD substrates. Because both major surfaces of the glass sheet are not allowed to directly contact any support material during the forming process, high surface quality of both of them can be achieved simultaneously. However, to be eligible for this process, the glass must meet certain requirements regarding liquidus viscosity, strain point, and the like. Therefore, this process cannot be used efficiently and effectively for many glass compositions. Moreover, it is known that this process requires the use of expensive machinery. Even though the LCD glass substrates made by fusion draw processes are quite thin, they are not thin enough to have the flexibility needed or desired for many applications.

Particularly, for high-silica glass sheet, such as glass sheet materials comprising at least 90% by mole, float process and fusion draw are impractical due to the high softening point of the glass material. Large-size high-purity silica glass sheets are useful, for example, as regular photomask substrates, LCD imagemask substrates, and the like. Such silica glass substrates are typically produced by cutting, grinding and polishing of large silica glass ingots produced, e.g., in large flame-hydrolysis furnaces, an extremely expensive and wasteful process. Such slicing and polishing approaches would be prohibitively expensive for making thin, flexible silica glass sheet with a thickness lower than 500 µm, good thickness uniformity and decent surface quality. A less expensive alternative process for making silica glass sheet, desirably with high surface quality and thickness uniformity, would be highly desirable.

By providing a soot process for making glass sheet materials, certain embodiments of the present invention satisfies the above need.

SUMMARY OF THE INVENTION

According to a first aspect of the present invention, provided is a process for making a glass sheet, comprising the following steps:

(A) providing a plurality of glass soot particles;
(B) depositing the glass soot particles on a curved deposition surface of a rotating drum to form a soot sheet; and
(C) releasing at least part of the soot sheet from the surface of the drum.

In certain embodiments of the process of the present invention, step (A) comprises generating a plurality of glass soot particles via a burner array.

In certain embodiments of the process of the present invention, in step (B), the soot sheet formed on the deposition surface has a substantially uniform thickness.

In certain embodiments of the process of the present invention, in step (B), the rotating drum has a circular cylindrical deposition surface rotating about an axis, on which the glass particles are deposited.

In certain embodiments of the process of the present invention, in step (B), the soot sheet formed is essentially continuous. In certain embodiments of the process of the present invention, in step (B), the soot sheet formed on the deposition surface has an average thickness ranging from 10 µm to 400 µm, in certain embodiments from 20 µm to 350 µm, in certain embodiments from 50 to 300 µm, in certain other embodiments from 50 to 200 µm.

In certain embodiments of the process of the present invention, in step (C), a gas jet is directed to the location of the deposition surface where the soot sheet is released to aid the release of the soot sheet.

In certain embodiments of the process of the present invention, the process comprises the following step (D) after step (C):

(D) moving the part of the soot sheet immediately released from the deposition surface away from the deposition surface as the drum is rotating and part of the soot sheet remains attached to the deposition surface.

In certain embodiments of the process of the present invention, step (D) is carried out while step (B) is carried out concurrently.

In certain embodiments of the process of the present invention, in step (D), the direction in which the part of the soot sheet immediately released from the deposition surface moves away from the deposition surface of the rotating drum where it is released is essentially tangential to the deposition surface.

In certain embodiments of the process of the present invention, in step (D), the movement of the soot sheet is guided by a soot-sheet-guiding device in contact with a main surface of the soot sheet.

In certain embodiments of the process of the present invention, in step (D), the soot-sheet-guiding device is placed in contact only with the peripheral portion of a main surface of the soot sheet.

In certain embodiments of the process of the present invention, the process further comprises the following step (EE):

(EE) sintering the soot sheet into a densified glass sheet.

In certain embodiments of the process of the present invention, the process further comprises the following step (E):

(E) sintering at least a part of the soot sheet into densified glass by heating the part of the moving soot sheet to a sintering temperature.

In certain embodiments of the present invention comprising step (E), the sintered glass sheet has a thickness ranging from 10 µm to 300 µm, in certain embodiments from 10 µm to 200 µm, in certain embodiments from 20 µm to 300 µm, in certain embodiments from 20 µm to 200 µm, in certain embodiments from 30 µm to 300 µm, in certain embodiments from 30 µm to 200 µm, in certain other embodiments from 50 µm to 200 µm.

In certain embodiments of the process of the present invention comprising step (E), in step (E), multiple parts of the soot sheet are subjected to sintering and the sintered parts form a continuous sheet of densified glass. In certain embodiments, the sintering is conducted sequentially.

In certain embodiments of the process of the present invention comprising step (E), in step (E), a majority of the main surface of the soot sheet being sintered is free from physical contact with a solid object during the sintering process.

In certain embodiments of the process of the present invention comprising step (E), in step (E), the part of the soot sheet being sintered is placed in a substantially vertical position.

In certain embodiments of the process of the present invention comprising step (E), in step (E), a peripheral portion of at least one main surface of the soot sheet being sintered is placed into contact with a soot-sheet-guiding device.

In certain embodiments of the process of the present invention comprising step (E), in step (E), both sides of both peripheral portions of both main surfaces of the soot sheet being sintered are placed into contact with a soot-sheet-guiding device, and the soot-sheet-guiding devices apply a tensile stress across the soot sheet during sintering.

In certain embodiments of the process of the present invention comprising step (E), in step (E), the soot-sheet-guiding device comprises a guide roller.

In certain embodiments of the process of the present invention comprising step (E), in step (E), the soot-sheet-guiding devices comprise moving belts or clamping rollers.

In certain embodiments of the process of the present invention, the process further comprises the following step (FF):

(FF) reeling at least part of the soot sheet into a roll.

In certain embodiments of the process of the present invention, the process further comprises the following step (FFF):

(FFF) cutting the soot sheet to form a discrete soot sheet body.

In certain embodiments of the process of the present invention, the process further comprises:

(FFF-1) a soot-sheet edge trimming device for removing a peripheral portion of the soot sheet.

In certain embodiments of the process of the present invention comprising step (E), the process further comprises the following step (F):

(F) reeling at least part of the sheet comprising densified glass into a roll.

In certain embodiments of the process of the present invention comprising step (E), in step (E), multiple parts of the soot sheet are subjected to sintering and the sintered parts form a continuous sheet of densified glass, and the process further comprises, after step (E), the following step (FA):

(FA) reeling the continuous sheet of densified glass into a roll.

In certain embodiments of the process of the present invention, step (A) comprises including a dopant in the glass soot particles.

In certain embodiments of the process of the present invention, in step (B), the deposited soot sheet consists essentially of a single layer of glass particles, having essentially a homogenous composition.

In certain embodiments of the process of the present invention, in step (B), the deposited soot sheet comprises at least two layers of glass particles, each having a composition differing from that of a contiguous layer.

In certain embodiments of the process of the present invention, in step (B), the deposited soot sheet consists essentially of a single layer of glass particles, having a low local soot density variation.

In certain embodiments of the process of the present invention, in step (B), the deposited soot sheet comprises at least two layers of glass particles, each having an average soot density differing from that of a contiguous layer.

In certain embodiments of the process of the present invention, in step (A), the glass soot particles comprise at least 90% by weight of silica (in certain embodiments at least 95%, in certain other embodiments at least 98%). In certain embodiments, the silica soot particles are formed by flame hydrolysis.

A second aspect of the present invention is directed to an apparatus for making a glass sheet, comprising:

(I) a soot-providing device for providing glass soot particles;

(II) a rotatable drum having an outer curved deposition surface on which the glass soot particles can be deposited to form a soot sheet;

(III) a soot-sheet-releasing device for releasing at least part of the soot sheet from the outer deposition surface of the rotatable drum; and (IV) a soot-sheet-guiding device for guiding the movement of the part of the soot sheet immediately released from the deposition surface away from the outer deposition surface of the rotatable drum.

In certain embodiments of the apparatus of the present invention, the soot-providing device (I) comprises a burner array.

In certain embodiments of the apparatus of the present invention, the rotatable drum (II) comprises a refractory material at least in the peripheral region providing the outer deposition surface. In certain embodiments, the refractory material is selected from silica, alumina, zirconia, zircon, and refractory metals.

In certain embodiments of the apparatus of the present invention, the soot-sheet-releasing device (III) comprises a gas jet.

In certain embodiments of the apparatus of the present invention, the soot-sheet-guiding device (IV) comprises a roller. In certain embodiments, the soot-sheet-guiding device (IV) comprises multiple rollers which clamp the peripheral portion of a main surface of the soot sheet.

In certain embodiments of the apparatus of the present invention wherein the soot-sheet-guiding device comprises a roller, the roller is positioned to be in direct contact substantially only with the peripheral portion of a main surface of the soot sheet.

In certain embodiments of the apparatus of the present invention, the apparatus further comprises:

(IV-1) a soot-sheet cutting device for severing part of the soot sheet.

In certain embodiments of the apparatus of the present invention, the apparatus further comprises:

(IV-2) a soot-sheet reeling device for forming the soot sheet into a roll.

In certain embodiments of the apparatus of the present invention, the apparatus further comprises:

(IV-3) a soot-sheet edge trimming device for removing a peripheral portion of the soot sheet.

In certain embodiments of the apparatus of the present invention, the apparatus further comprises:

(V) a soot-sheet-sintering device for sintering at least part of the soot sheet to densified glass sheet.

In certain embodiments of the apparatus of the present invention comprising the soot-sheet-sintering device (V), the soot-sheet-sintering device (V) comprises multiple soot-sheet-guiding devices (such as clamping rollers) capable of providing tensile stress to the soot sheet when the soot sheet is sintered.

In certain embodiments of the apparatus of the present invention comprising the soot-sheet-sintering device (V), the soot-sheet-sintering device (V) comprises an induction heater.

In certain embodiments of the apparatus of the present invention comprising the soot-sheet-sintering device (V), the soot-sheet-sintering device (V) is oriented such that negligible sag is created by gravity to the soot sheet when the soot sheet is being heated.

In certain embodiments of the apparatus of the present invention, the apparatus further comprises:

(VI) a glass-sheet cutting device for severing part of the glass sheet.

In certain embodiments of the apparatus of the present invention, the apparatus further comprises:

(VII) a glass-sheet reeling device for forming the glass sheet into a roll.

Certain embodiments of the process and apparatus of the present invention have one or more of the following advantages: (i) capability of forming glass sheet continuously without the need of a liquid metal bath; (ii) ability to produce glass sheet with high surface quality with minimal or no additional surface polishing; (iii) ability to produce soot glass sheet with uniform thickness and composition; (iv) capability to produce thin glass sheet with a high thickness uniformity; and (v) capability to produce glass sheet with multiple layers with differing chemical compositions and/or physical properties. For many applications, one or more of these advantages is highly desired.

Additional features and advantages of the invention will be set forth in the detailed description which follows, and in part will be readily apparent to those skilled in the art from the description or recognized by practicing the invention as described in the written description and claims hereof, as well as the appended drawings.

It is to be understood that the foregoing general description and the following detailed description are merely exemplary of the invention, and are intended to provide an overview or framework to understanding the nature and character of the invention as it is claimed.

The accompanying drawings are included to provide a further understanding of the invention, and are incorporated in and constitute a part of this specification.

DETAILED DESCRIPTION OF THE INVENTION

Unless otherwise indicated, all numbers such as those expressing weight percents of ingredients, dimensions, and values for certain physical properties used in the specification and claims are to be understood as being modified in all instances by the term "about." It should also be understood that the precise numerical values used in the specification and claims form additional embodiments of the invention. Efforts have been made to ensure the accuracy of the numerical values disclosed in the Examples. Any measured numerical value, however, can inherently contain certain errors resulting from the standard deviation found in its respective measuring technique.

As used herein, in describing and claiming the present invention, the use of the indefinite article "a" or "an" means "at least one," and should not be limited to "only one" unless explicitly indicated to the contrary. Thus, for example, reference to "a main surface" includes embodiments involving one or two main surfaces, unless the context clearly indicates otherwise.

Figure 6:
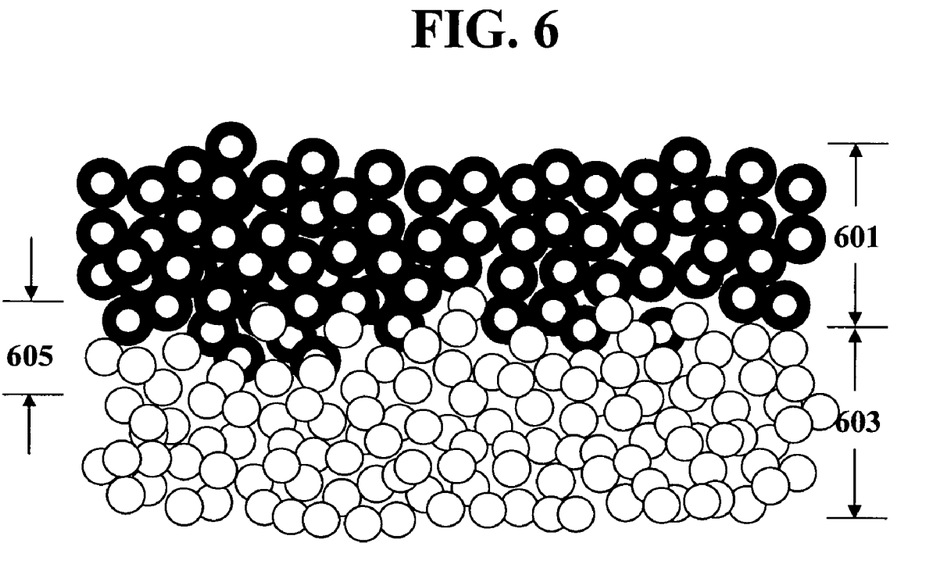
FIG. 6 is a schematic illustration of the cross-section of a soot sheet comprising two distinct layers of soot particles.

As used herein, a "soot layer," or a "layer of soot," means a stratum of essentially homogeneously distributed glass particles bonded with adjacent particles or not, having a thickness of equal to or larger than the average diameter of the individual particles. Thus, a soot layer may comprise a plurality of particles across the thickness. By "essentially homogeneously distributed" is meant that the particles are arranged such that the average composition and properties are essentially the same in a specific volume within the layer significant to the final application of the material. Of course, the composition and/or properties are allowed to deviate within a certain range as the resolution becomes smaller and smaller. However, as long as such deviation is not significant for the intended use of the material, such deviation is tolerated within a single soot layer. Where the soot sheet comprises multiple soot layers, the difference in terms of composition and/or properties between contiguous layers is sufficiently significant for the intended use of the material. As is typically understood by one of ordinary skill in the art, the composition and/or properties at the interface of contiguous layers are allowed to deviate from the bulk of both layers to a certain extent, as long as the thickness of the interface between the contiguous layers is insignificant for the purpose of the final application of the material. FIG. 6 schematically illustrates the cross-section of a two-layer soot sheet. One species of glass particles form a first soot layer 601. Another species of particles form a second layer 603 adjacent to the first layer soot layer 601 having a distinctive composition and/or physical properties. In the interface region 605 of the layers 601 and 603, blending of the two species of particles can occur. As used herein, a "glass sheet," unless specifically indicated otherwise, includes both sheet materials made of consolidated glass and sheet materials comprising a plurality of glass soot particles (i.e., soot sheets). As is typically understood in the art, a sheet has two continuous surfaces with areas larger than all other surfaces. As used herein, the two continuous surfaces with the largest areas are referred to as main surfaces.

In certain embodiments, the main surfaces have areas higher than or equal to 5 times of the area of the third largest surface. The distances between the two main surfaces at a certain location is called the thickness of the sheet at that location. In certain embodiments of the sheet material of the present invention, including soot sheet and the sintered glass sheet, the two main surfaces are substantially parallel with each other when the sheet is laid on the surface of a flat substrate. In these embodiments, the sheet has a substantially uniform thickness across the main surfaces. In certain other embodiments, the two main surfaces can be non-parallel to each other, and the thickness of the sheet can vary from location to location. The main surfaces of the sheet can be either or both planar or curved. A soot sheet is a sheet material comprising at least one soot layer, wherein the glass soot particles are connected and bonded with at least part of the particles proximate thereto. However, in a soot sheet, voids are present at the grain boundary of at least some of the particles. In an ideal, completely densified glass, no void is present in the material, and the density of the glass would reach a maximum at a given temperature and pressure.

Various soot deposition method for making glass materials are known. For example, OVD (outside vapor deposition), IVD (inside vapor deposition) and VAD (vapor axial deposition) processes were used in making high-purity, doped and un-doped fused silica materials. OVD, IVD and VAD processes are typically two-step processes comprising a first step of depositing glass soot particles on the outer surface of a mandrel or a bait rod to form a soot body, and a second step of sintering the soot body into consolidated glass. U.S. patent application Ser. No. 11/305,857 discloses a planar deposition process for making fused silica glass by depositing a layer of silica soot particles on an essentially planar deposition surface of a rotating substrate, followed by sintering of the soot layer to form consolidated glass. These processes and apparatus known in the art are not economical for making large-area soot sheet or glass sheet; and without further adaptation, cannot be used directly for making soot sheet or glass sheet in a continuous fashion.

As used herein, the term "low local soot density variation" means that the soot sheet deposited, or a single layer of soot particles deposited, has, in a sample area in one of the main surfaces having a radius of at least 0.2 mm, in certain embodiments preferably at least 0.2 cm, a local soot density variation of less than 20% of the average bulk density of the sample area, or less than 0.2 g/cm$^3$, whichever is greater. In certain embodiments of the present invention, the soot sheet deposited by using the process or apparatus of the present invention has, in a sample area in one of the main surfaces having a radius of at least 0.2 mm, in certain embodiments preferably at least 0.2 cm, a local soot density variation of less than 10% of the average bulk density of the sample area, or less than 0.1 g/cm$^3$, whichever is greater. In the present invention, "local soot density" at a given location in an identified area with certain given thickness is the average of measured local soot density throughout the thickness at the given location. The resolution of local soot density measurement is arbitrarily chosen as the average soot density within a 10 μm×10 μm×10 μm cubic space. Soot density is calculated by dividing the mass of the soot particles in a given volume occupied by the soot particles, including the total volume of all the soot particles and all the voids and free space inside grains and between the grains.

The term "essentially uniform temperature" means that the temperature of the surface or object concerned has an average temperature $T_m$, and the temperature at different locations of the surface or object lies in the range of $T_m \pm 50°$ C. The average temperature $T_m$ may vary over time. In certain embodiments of the present invention, it is desired the temperature at different locations of the surface or object having essentially a uniform temperature lies in the range of $T_m \pm 25°$ C., in certain other embodiments in the range of $T_m \pm 10°$ C.

As used herein, "sintered glass" and "consolidated glass" are used interchangeably to mean a glass material having a density higher than or equal to 95% of the highest possible density (Dmax) of a glass material having the same chemical composition and microstructure under STP condition (pressure of 101.325 kPa, temperature at 273K). In certain embodiments, it is desired that the sintered glass has a density of at least 98% of Dmax under STP. In certain embodiments, it is desired that the sintered glass has a density of at least 99% of Dmax under STP. In certain embodiments, it is desired that the sintered glass has a density of at least 99.9% of Dmax under STP.

The present inventors have found that, it is possible to release a glass soot sheet formed on a deposition surface without breaking. Such glass soot sheet can be transferred and processed downstream into consolidated glass sheet. Based on this discovery and other expertise, the present inventors devised the process and apparatus for making glass sheet materials, including glass soot sheet and sintered glass sheet. As to the sintered glass sheet, the process of the present invention is essentially a soot-to-glass process, i.e., it requires a step of forming a soot sheet followed by a step of sintering the soot sheet to a consolidated glass sheet.

In broad terms, the process of the present invention comprises the following steps:

(A) providing a plurality of glass soot particles;

(B) depositing the glass soot particles on a curved deposition surface of a rotating drum to form a soot sheet; and (C) releasing at least part of the soot sheet from the surface of the drum.

The soot sheet per se can find many applications. To obtain consolidated glass, an additional step of sintering the soot sheet is required.

In broad terms, the apparatus of the present invention comprises:

(I) a soot-providing device for providing glass soot particles;

(II) a rotatable drum having an outer curved deposition surface on which the glass soot particles can be deposited to form a soot sheet;

(III) a soot-sheet-releasing device for releasing at least part of the soot sheet from the outer deposition surface of the rotatable drum; and (IV) a soot-sheet-guiding device for guiding the movement of the part of the soot sheet immediately released from the deposition surface away from the outer deposition surface of the rotatable drum.

To make consolidated glass, additional component for sintering the soot glass sheet is needed. The present invention will be further described and illustrated with reference to the accompanying drawings. It is to be understood that the drawings represent only certain specific embodiments of the present invention. Thus the present invention should not be interpreted to be limited to those shown in the drawings only.

The process of the present invention starts with a step of providing glass soot particles. Various devices and processes for providing soot particles known in the art can be used. Soot particles are typically transferred to the deposition surface in the form of soot stream. Examples of the soot-providing devices that can be used in various embodiments of the process of the present invention include: flame hydrolysis burners, such as those typically used in the IVD, OVD and VAD and planar deposition processes. Referring to FIGS. 1, 2 and 3, 105 and 106 are burners. For example, an exemplary burner in the production of silica glass via flame hydrolysis comprises holes through which silicon-containing precursor compounds, such as OMCTS (octamethylcyclotetrasiloxane) are introduced into a flame of $H_2$, $CH_4$ or other fuels. OMCTS is oxidized and hydrolyzed in the flame to produce fine silica soot particles.

The operation of burners typically involves chemical reactions of the precursor compounds at an elevated temperature. U.S. Pat. No. 6,606,883 describes burners for use in the production of doped and un-doped fused silica glasses, the relevant parts thereof are incorporated herein in their entirety. U.S. Pat. No. 5,922,100 to Cain et al. discloses examples of premixed, natural gas burners that may be used in the present invention, the relevant parts thereof are incorporated herein by reference. However, the burners that may be used in the present invention are not restricted to those described in U.S. Pat. Nos. 5,922,100 and 6,606,833. Burners mentioned in U.S. Pat. Nos. 6,837,076, 6,743,011, 6,736,633 may be used as well in the present invention. The burners can be further assisted by plasma and other heating means. Though burners are typically used for the production of synthetic silica glass, they can be used for producing other oxide glass materials as well.

In addition to burners, other devices, such as plasma heated soot sprayer, and the like, can be used to provide the soot particles needed for the process of the present invention. In a plasma heated soot sprayer, pre-formed soot particles, of a single or multiple compositions, are provided at a certain velocity and allowed to pass a plasma which heats the soot particles to a desired temperature for the deposition step. Further, in certain embodiments of the present invention, a combination of a burner and a plasma heated soot sprayer may be used to provide the glass soot particles. For the purpose of convenience, unless specified to the contrary, "burners" are used hereinafter to represent all soot-providing devices useable for the present invention unless specified to the contrary.

The soot particles as provided may consist essentially of a single oxide, such as in the case of production of non-doped high-purity silica glass. Alternatively, the soot particles may be doped when they are being provided. Thus, e.g., where the soot-providing device comprises a flame hydrolysis burner, doping can take place in the flame hydrolysis process by including precursors of the dopants into the flame. For another example, where the soot-providing device comprises a plasma heated soot sprayer, the pre-formed soot particles sprayed from the sprayer can be pre-doped, or alternatively, the sprayed soot particles may be subjected to an atmosphere comprising the dopants such that the soot particles become doped in the plasma. In certain embodiments, the soot particles provided advantageously have an essentially homogeneous composition. In certain embodiments, the soot particles provided have varying compositions. For example, soot particles of the main glass component can be provided by one device, and soot particles of the dopants can be provided by another, separate device. It is possible in certain embodiments that the soot particles can mix with each other to form composite particles with various compositions. It is also possible that in certain embodiments the soot particles are substantially prevented from adhering to each other to form mixed particles prior to being deposited to the deposition surface.

The soot particles are deposited on a curved surface of a rotating deposition drum. The curved surface 103 does not intersect with the rotation axis 104. In certain embodiments, the deposition drum has at least the peripheral part made of a refractory material, which provides the soot deposition surface. Thus, the deposition drum can have a core made of, for example, steel or aluminum or other materials, and a clad made of a differing material, such as silica, graphite, zircon, zirconia, and the like, which provides the deposition surface. Alternatively, the drum can be made of essentially a single material, such as silica of various purity (high-purity synthetic silica, naturally-occurring quartz having a lower grade or purity, and the like) depending on the need of the purity level of the soot sheet to be formed. The drum is capable of rotating about an axis 104. In one advantageous embodiment, the drum has a substantially cylindrical outer surface rotating about the axis of the outer surface. In one particularly advantageous embodiment, the drum has a substantially circular cylindrical outer surface rotating about the center axis of the outer surface, with a radius of the outer circular surface of rr and an effective length (defined as the length of the part of the drum across which soot particles are deposited) of HH. By adjusting the effective length and/or the dimension of the diameter of the outer circular surface, one can adjust the size of the soot sheet and the sintered glass sheet.

Figure 1:
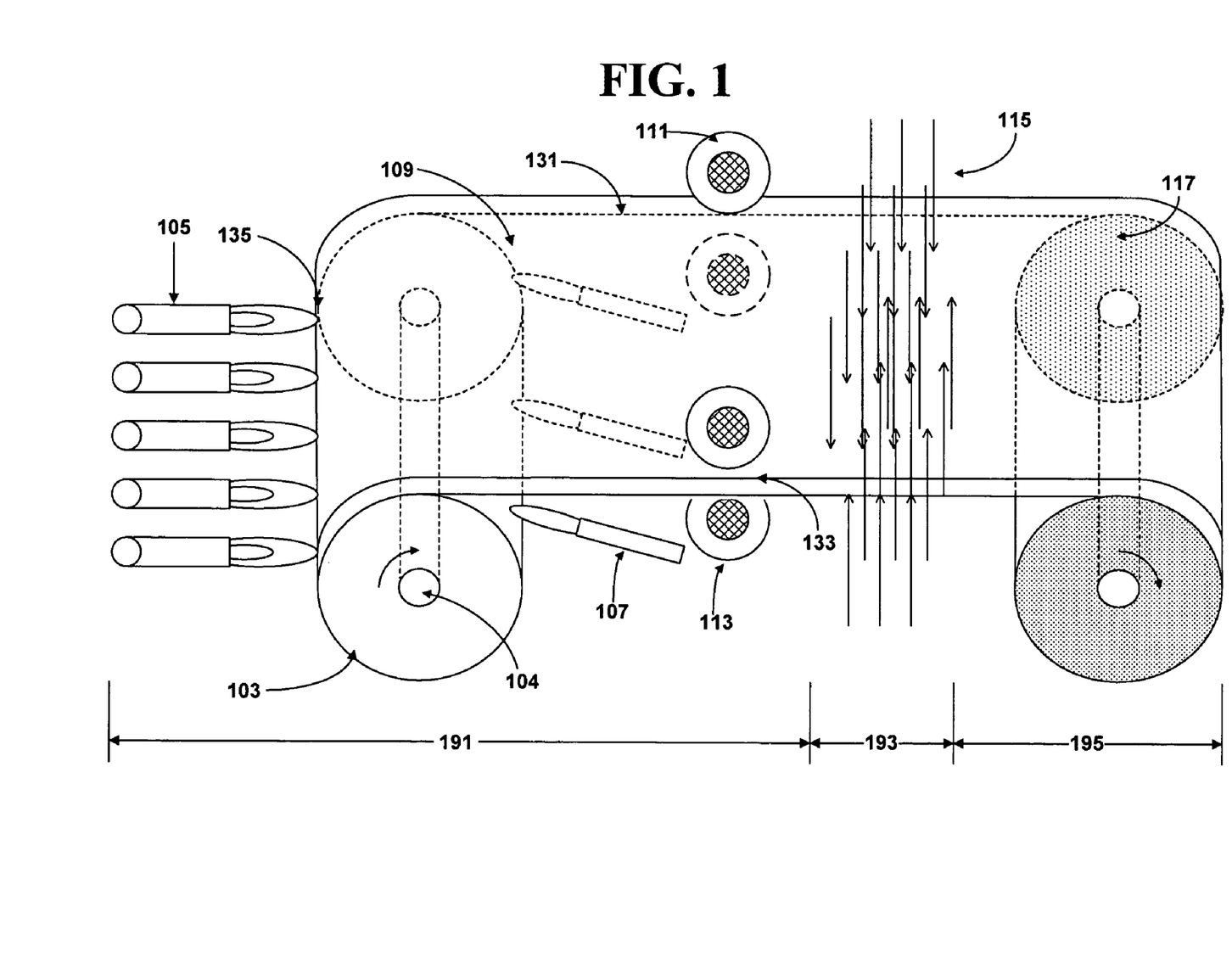
FIG. 1 is a schematic illustration of an operating apparatus with capability of continuous production of glass sheet according to one embodiment of the present invention.
Figure 2:
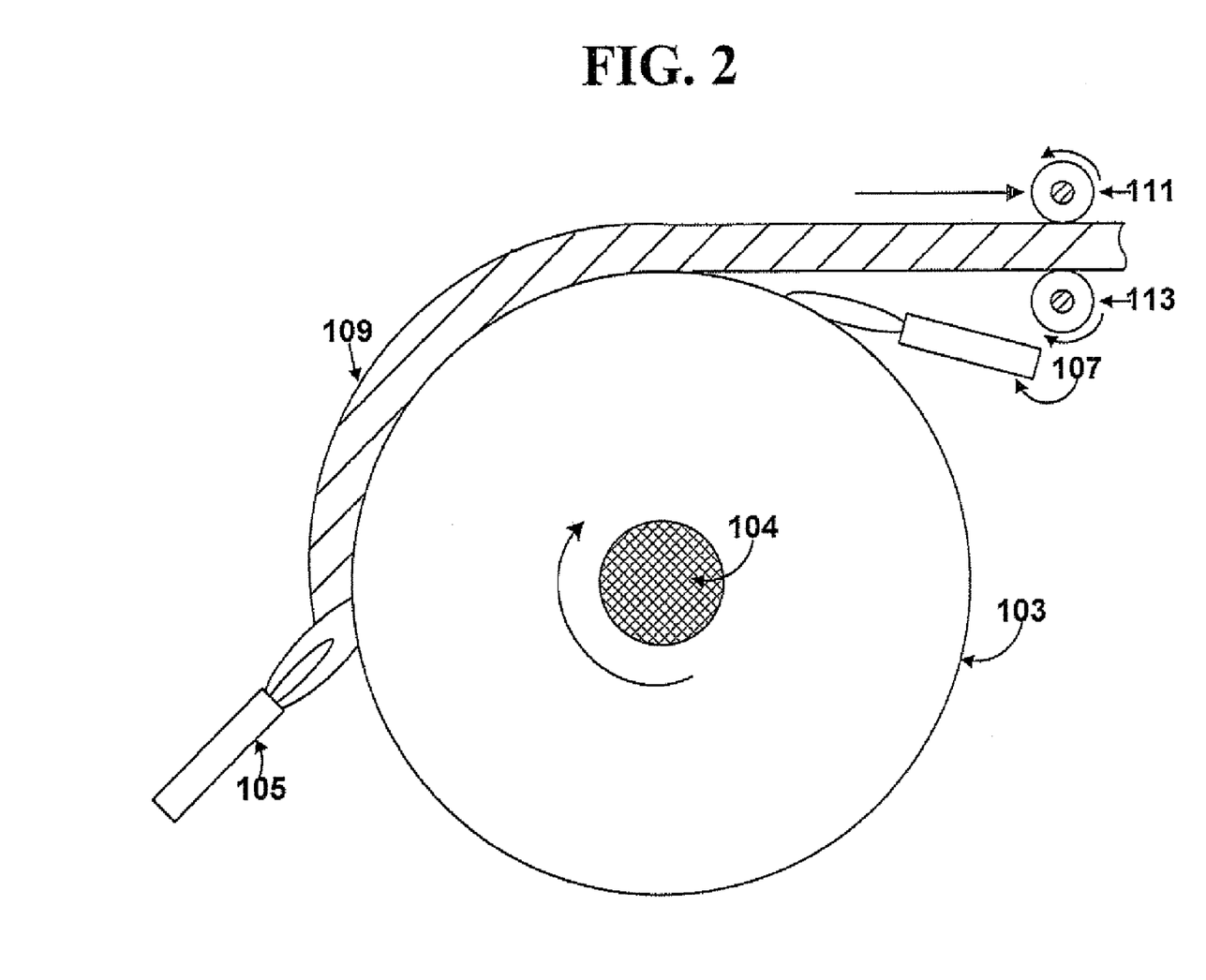
FIG. 2 is a schematic illustration of the soot-depositing part and soot-releasing part of the operating apparatus shown in FIG. 1, when viewed from the direction of the rotation axis of the soot deposition drum.
Figure 3:
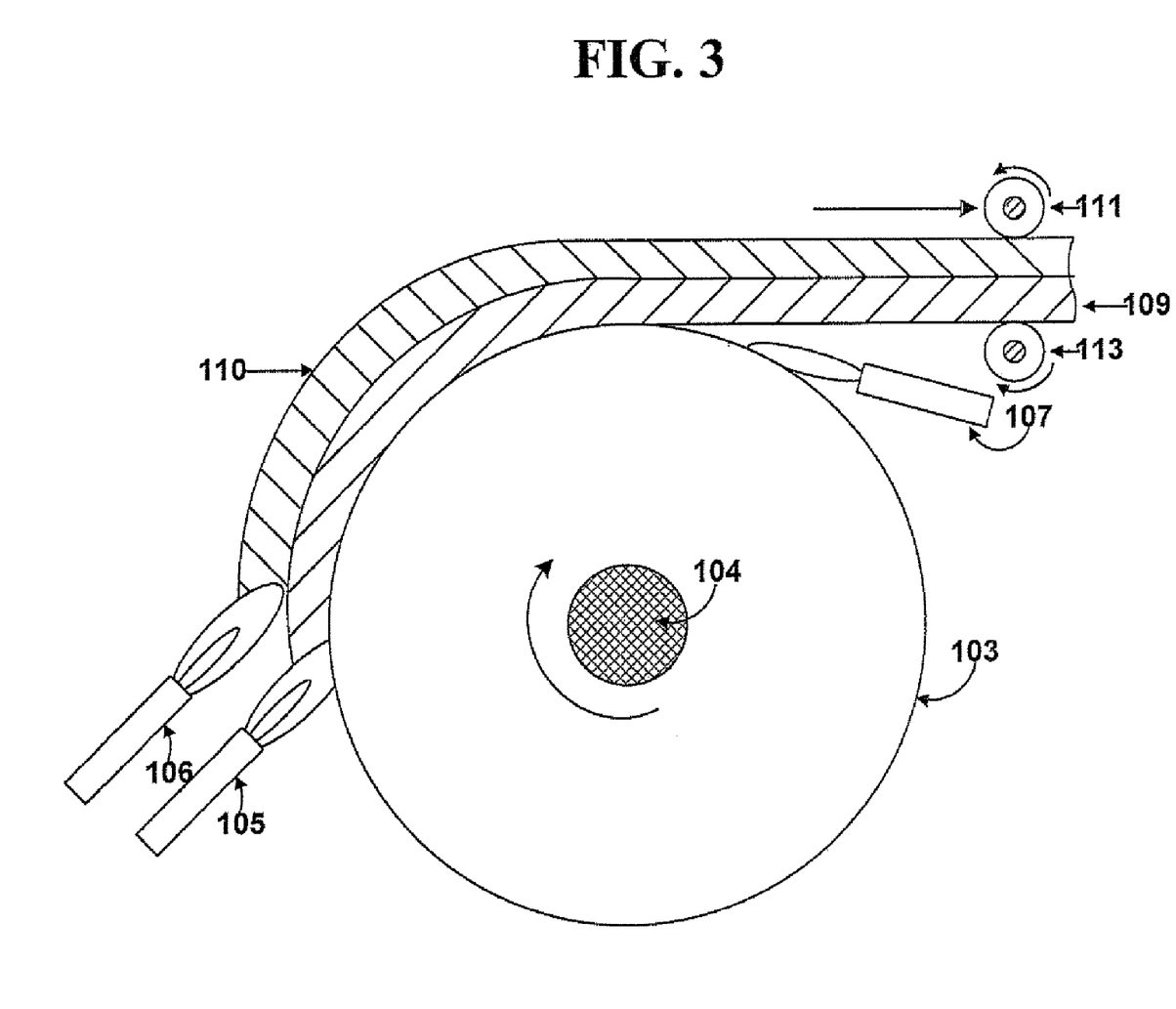
FIG. 3 is a schematic illustration of the soot-depositing part and soot-releasing part of the operating apparatus of another embodiment of the present invention, when viewed from the direction of the rotation axis of the soot deposition drum.

The curved surface of the rotating drum can take various shapes. For example, it is contemplated that in certain embodiments the curved surface can be a closed smooth surface, such as a cylindrical surface, or a closed surface with abrupt turning points, such as the surface of a cube, elongated cube, a combination of a part of a cylindrical surface and a flat surface, and the like. In FIGS. 1-3, the illustrated drum has a circular cylindrical outer deposition surface 103, on which soot particles generated by burners 105 and 106 are deposited to form continuous soot layers 109 and 110. In one other embodiment, the drum has a substantially elliptic cylindrical outer surface rotating about the center axis of the outer surface. In certain advantageous embodiment, the rotation of the drum is uni-directional, i.e., during the glass-forming process, the drum rotates in a single direction, clockwise or counter-clockwise. Such uni-directional rotation is particularly advantageous for a drum with a circular cylindrical outer surface. However, it is not excluded that the drum may oscillate during the soot deposition process, i.e., it may change rotation direction intermittently. Such oscillation can be advantageous for drums having an elliptic cylindrical outer surface. In certain embodiments, the soot particles are deposited on part of the deposition surface of the drum. Thus, in the case of a circular cylindrical drum, various embodiments can be contemplated, inter alia: (i) in certain embodiments, the soot sheet deposited covers only part of the length of the drum; (ii) in certain embodiments, the soot sheet deposited on the surface covers only part of the circular cross-section of the cylinder when it is viewed in a direction parallel to the center axis of the cylinder; and (iii) in certain embodiments, the soot sheet deposited covers only part of the length of the drum, and only part of the circular cross-section of the cylinder when it is viewed in a direction parallel to the center axis of the cylinder. If the soot particles are allowed to be deposited across the full circular cross-section to form a continuous and closed sleeve, the sleeve would have to be cut into at least two separate parts for the soot sheets to be released from the deposition surface in the next step. For the purpose of convenient description and illustration, the dimension of the soot sheet along the length of the drum is called the width of the soot sheet, and the dimension of the soot sheet along the circumference of the circular cross-section of the deposition surface is called the length of the soot sheet. Thus, if a soot sheet is formed covering the full length but half of the circumference of a circular cylindrical rotating drum having a length of HH and a cross-section radius of rr, the soot sheet would have a width of HH and a length of π·rr.

In certain embodiments of the present invention, a main surface of a soot sheet formed on the deposition surface has four sides: two sides substantially along the direction of the rotation axis; and the other two sides spreading and optionally extending along the circumference of the curved outer surface of the rotating drum. For the convenience of description, the side substantially along the direction of the rotation axis of the soot sheet formed at the earliest stage of the process is referred to as the first end of the soot sheet; the side of the soot sheet substantially along the direction of the rotation axis formed at the latest stage is referred as the second end of the soot sheet; and the two sides (131 and 133) spreading and/or extending along the circumference of the curved outer surface are referred to as the edges of the soot sheet.

In certain embodiments of the present invention, during the deposition process, the burners 105 and 106 are maintained stationery relative to the rotation axis of the rotating drum. In these embodiments, in order to obtain a relatively wide soot sheet across the deposition surface, multiple burners and/or burner arrays are needed. Alternatively, oscillation of burners along the length of the drum in a direction along the rotation axis can be advantageously employed.

In certain embodiments, it is desired that the soot sheet formed on the deposition surface of the drum, upon removal from the deposition surface, can be laid upon a flat surface of a substrate without breaking due to its own gravity. In certain embodiments, it is even desired that the soot sheet, upon removal from the deposition, can be pulled or pushed by an external force to a substantially flat geometry without breaking. To that end, it is desired that the soot glass sheet has a certain level of flexibility such that stress exerted to a certain desired extent would not cause breakage of the soot sheet. The flexibility of the soot sheet is determined by the following factors, inter alia: (a) average soot density; (b) thickness of the soot sheet; (c) curvature of the deposition surface; (d) temperature of the soot sheet when it is formed; and (e) thickness of the soot sheet. For a drum having a substantially circular cylindrical outer deposition surface, the larger the diameter of its circular cross-section (when cut by a plane perpendicular to the center axis of the cylinder), the closer the curvature of the deposited soot sheet to a flat planar sheet, thus the lower the stress to the soot sheet when the sheet is pulled or laid flat. Flexibility of the soot sheet determines whether the soot sheet can be rolled into a roll without breaking by using a mandrel at a given diameter.

As mentioned supra, average soot density of the soot sheet is one of the factors determining the flexibility of the soot sheet. Typically, for glass soot sheet comprising more than 90% of silica, it is desired that the average density of the soot sheet ranges from 0.50 to 1.50 g·cm$^{-3}$, in certain embodiments from 0.80 to 1.25 g·cm$^{-3}$.

In certain embodiments, in order to obtain a good flexibility of the soot sheet, it is desired that the thickness of the sheet ranges from 10 μm to 400 μm, in certain embodiments from 20 μm to 350 μm, in certain embodiments from 50 to 300 μm, in certain embodiments from 50 to 200 μm. Continuous rollable silica soot ribbon having a thickness of about 100 μm as long as more than 5 m was made by the present inventor.

In certain embodiments, it is highly desirable that the soot sheet deposited has a low local soot density variation. Low local soot density variation is important for obtaining a substantially homogeneous composition of the final sintered glass sheet in certain embodiments of the present invention. The following factors, inter alia, impact the local soot density variation of the soot sheet: (i) design and location of burners or other soot-providing devices; (ii) movement of the burner relative to the deposition surface; (iii) temperature variation of the particles provided by the burners or other soot-providing devices; and (iv) temperature variation of the deposition surface of the drum. A burner array 105 comprising multiple burners can be advantageously used to obtain a deposited layer of soot with a substantially homogeneous chemical composition and a substantially uniform thickness. By "uniform thickness" means the thickness variation of the soot sheet is less than or equal to 20% of the average thickness of the soot sheet. In certain embodiments, it is desired that the thickness variation of the soot sheet is less than or equal to 10% of the average thickness of the soot sheet. In certain embodiments, the movement of the burner(s) relative to the deposition surface needs to be modulated such that a soot sheet with substantially uniform thickness can be obtained. In certain embodiments, the burner(s) 105 are allowed to oscillate from one side of the rotating drum to the other to deposit a soot sheet with substantially uniform thickness. Substantially uniform temperature on the deposition surface before the burner flame directly contacts the deposition surface can be important for obtaining a uniform local soot density in the soot sheet in certain embodiments, as mentioned supra. To control a substantially uniform temperature across the deposition surface of the drum, the drum can be heated or cooled, from inside or outside. To ease the separation of the soot sheet from the deposition surface of the drum in the downstream process steps, it is desired that the temperature of the soot particles and the temperature of the deposition surface are not too high such that the soot particles melt and permanently bond with the soot deposition surface. Generally, the higher the average temperature of the soot particles when they are being deposited, the more likely they are to bond with each other to form a dense and strong soot sheet.

To obtain a high throughput of the soot sheet, several approaches may be used, alone or in various combinations: (i) increasing the angular speed of the rotation of the rotating drum; (ii) increasing the dimension of the cross-section of the rotating drum (such as the diameter of a circular cylindrical drum); (iii) increasing the effective length of the rotating drum; and (iv) using multiple burners (or even multiple burner arrays) to provide more soot particles.

Referring to FIG. 3 wherein two burners (or two burner arrays) 105 and 106 to deposit two layers of soot 109 and 110 on the deposition surface of the rotating drum. In certain embodiments, it is desired that the two layers of soot 109 and 110 have essentially the same chemical composition and physical properties such as average soot density, average soot particle size, and the like. To that end, the burners 105 and 106 can be substantially identical providing two soot streams having substantially the same compositions. Burner 105 provides soot particles that are deposited to form the base layer of soot 109 directly in contact with the deposition surface of the drum. Subsequently, burner 106 provides soot particles that are deposited to form the additional layer 110 over soot layer 109 having the same or a differing thickness. Layers 109 and 110 together form the soot sheet. In certain embodiments, it is desired that the two layers 109 and 110 have differing chemical compositions. For example, each layer may comprise silica particles doped with a differing dopant. In certain embodiments, it is desired that the two layers 109 and 110 have essentially the same chemical composition but differing physical properties such as average soot density, average soot particle size, and the like. Such differing layers 109 and 110 together form a soot layer with multiple sub-layers, which can find use in various applications. Even though FIG. 3 illustrates only a two-layer embodiment, it is possible to create a soot sheet with even more layers of soot by applying this same design principle. It is also contemplated that such multiple-layer structure can be effected by a single burner (or burner array) providing differing soot particles intermittently and alternatively by carefully modulating the motion of the burner (or burner array) relative to the deposition surface of the drum. Where multiple soot particle layers are desired, and cross-contamination of the adjacent layers are desired to be avoided, it is desired that the multiple burners providing the various layers are separated physically when being operated. Such physical separation can be effected by, inter alia: (i) modulation of the movement of the burners; (ii) operating the burners at differing time periods; and (iii) applying physical partitions between the burners to prevent soot particles in one stream from entering another.

In certain embodiments of the present invention, the soot sheet formed on the deposition surface of the rotating drum can stay on the deposition surface until the completion of the deposition process. Thus, after a soot sheet with desired length, width and thickness is formed on the deposition surface, the burners can be shut down, and the thus formed soot sheet be released from the deposition surface. Alternatively, in certain other embodiments of the present invention, as described in greater detail infra, part of the soot sheet formed can be continuously released and continuously moved away from the deposition surface of the rotating drum. As used herein, "release" means cause to detach.

Bonding of the soot particles with the deposition surface to a certain degree is needed for the initial formation of the soot sheet on the deposition surface. However, as noted supra too strong a bond between the soot sheet and the deposition surface can lead to difficulty in releasing the soot sheet from the deposition surface. Limited bonding between the deposition surface and the soot sheet deposited thereon is conducive to easy release of the soot sheet. In certain embodiments, the bonding can be weakened by a temperature gradient between the locations where the soot particles are deposited to form the soot sheet and the location where the soot sheet is released from the deposition surface, if the soot sheet has a differing coefficient of thermal expansion (CTE) from that of the deposition surface, and the release may occur spontaneously due to the stress caused by the temperature gradient. In certain other embodiments, certain tools ("soot-sheet-releasing devices") and/or methods can be used to induce, initiate or aid the release of the soot sheet from the deposition surface. Examples of soot-sheet-releasing devices include, but are not limited to: a knife, a chisel, a cutting wire or thread, or a stream of gas. A stream of gas ("gas jet") 107 can be advantageous in certain embodiments due to its ability to cool or heat the soot sheet and/or the deposition surface to induce a thermal stress at the interface, or to maintain the stress within a desired range, and to clean the deposition surface, all at the same time. Another advantage of gas jet is the ability to adjust the mechanical force it exerts on the soot sheet by tailoring the pressure thereof, and pinpoint the location where force is directed to the soot sheet by choosing the direction of the gas jet and its size. When the gas jet uses a stream of pressurized air, it is sometimes called an airknife.

The soot sheet can be released from the deposition surface of the drum while it is rotating or while it is static. In certain embodiments of the present invention, the drum remains static when the soot sheet is released and removed from the deposition surface, and the release process starts from either or both of the first and second ends of the soot sheet. In these embodiments, a mechanical force is typically exerted on the soot sheet at the interface between the soot sheet and the deposition surface to allow the gradual release of the soot sheet from the deposition surface. In certain other embodiments, the drum rotates when the soot sheet is being released and removed from the deposition surface, and the part of the soot sheet immediately released from the deposition surface is moved away from the deposition surface in a continuous manner as if it is rolled off the deposition surface. In these embodiments, a gas jet directed to the location where the release takes place can be advantageously employed to aid the release. In these embodiments, it is generally desired the direction of the movement of the soot sheet relative to the deposition surface is substantially tangential to the curved deposition surface. By "substantially tangential" means the direction of the movement of the soot sheet relative to the deposition surface is within 10° of the tangential direction of the curved surface at the location of release. Maintaining a substantially tangential direction of the movement of the soot sheet can reduce the stress exerted on the soot sheet at the location of release that could cause breakage of the soot sheet.

Thus, as can be seen from FIGS. 1, 2 and 3 and the above description, in certain embodiments of the present invention, it is possible to carry out a step (D) after step (C) as follows:

(D) moving the part of the soot sheet immediately released from the deposition surface away from the deposition surface as the drum is rotating and while part of the soot sheet remains attached to the deposition surface.

As shown in FIGS. 1, 2 and 3, in certain embodiments of the present invention, it is also possible to carry out steps (B) and (D) concurrently, enabling the continuous production of a prolonged soot sheet while maintaining a substantially non-interrupted rotation of the drum for multiple revolutions. These embodiments of continuous process are particularly advantageous. It enables the continuous production of long ribbon of soot sheet and glass sheet without interruption.

In certain embodiments, especially in those embodiments involving continuous production of long ribbon of soot sheet and/or sintered glass sheet, when the above step (D) is carried out, the continuous movement of the soot sheet away from the deposition surface after its release is advantageously guided by certain soot-sheet-guiding device. In certain embodiments of the present invention, the soot-sheet-guiding device is in direct contact with a main surface of the soot sheet, providing support and guidance for the soot sheet when it moves. In certain other embodiments, the soot-sheet-guiding device comprises multiple members that are in direct contact with both main surfaces of the soot sheet. Because the soot sheet typically have a thickness much smaller than its dimensions of the main surfaces, it is desired that the soot-sheet-guiding device is placed in direct contact with a main surface to provide meaningful guidance and/or power to the movement of the soot sheet. To maintain a high surface quality of the soot sheet and avoid contamination and scratching by the soot-sheet-guiding device such as rollers, it is desired that the soot-sheet-guiding device (111, 113, 405) is placed in direct contact substantially only with the peripheral portions of a main surface of the soot sheet. By "peripheral portions of a main surface" means the portions close to the edges (defined above) of the main surface. In certain such embodiments, such multiple members clamp the soot sheet. The soot-sheet-guiding device can be active in certain embodiments, i.e., it is powered by external force not provided by the soot sheet such that the device provides part of the force that moves the soot sheet in the desired direction. In certain embodiments, the soot-sheet-guiding device can be passive, i.e., it is not powered by external force other than that from the soot sheet in contact therewith and the energy needed for the movement of any member of the soot-sheet-guiding device is provided by the soot sheet with which the device directly contacts. In certain embodiments of the present invention, the soot-sheet-guiding device comprises a conveyor belt. In certain other embodiments, the soot-sheet-guiding device comprises a guide roller.

The soot sheet released and transferred away from the deposition surface may be cut into discreet smaller soot sheet pieces by using a soot-sheet-severing device. Various cutting devices and methods can be used for severing the soot sheet. In certain embodiments, laser cutting is particularly advantageous. Such soot sheet pieces can then be used as is or subjected to further down-stream processing, including, but not limited to, sintering as described in greater detail infra. Where desired, it is also possible to reel the soot sheet into a roll of soot sheet, with or without a spacing material, such as paper, cloth, and the like, placed in between the adjacent surfaces of the soot sheet in the roll. Where desired, before the soot sheet is cut into discreet pieces for down-stream use, or before the soot sheet is reeled into a roll, a peripheral portion, in certain embodiments both the peripheral portions, of the soot sheet can be removed. Again, laser cutting, inter alia, can be advantageously used for the edge removal.

Where sintered glass sheet is desired, the soot sheet formed according to the present invention, or a part thereof, can be subjected to a sintering step (EE) where the soot sheet is heated to a sintering temperature where the soot particles in the soot sheet are converted into a densified piece of glass sheet. Where step (D) is carried out, it is desirable that the following step (E) is carried out subsequently to obtain a sintered piece of glass:

(E) sintering at least a part of the soot sheet into densified glass by subjecting the part of the moving soot sheet sequentially to a sintering temperature.

Thus, the continuously moving soot sheet can be fed into a sintering zone (193) of the apparatus of the present invention in certain embodiments, where at least part of the soot sheet is heated to a sufficiently high temperature for a sufficient period of time to convert that part of the soot sheet into densified glass. One skilled in the art can determine the proper sintering temperature and sintering time depending on, inter alia, the composition of the glass, the desired quality of the final glass, and the throughput of the process. For example, to sinter a soot sheet of high purity silica, it is typically desired that the sintering temperature be from 1000° C. to 1600° C., in certain embodiments from 1400° C. to 1600° C. As is typically known by one skilled in the art, during the sintering stage, the soot particles forming the soot sheet are allowed to form more chemical bonds at the grain boundary to result in a larger, continuous glass network. In certain embodiments, it is desirable that the sintering results in a glass material essentially free of voids and gas bubbles.

Figure 4:
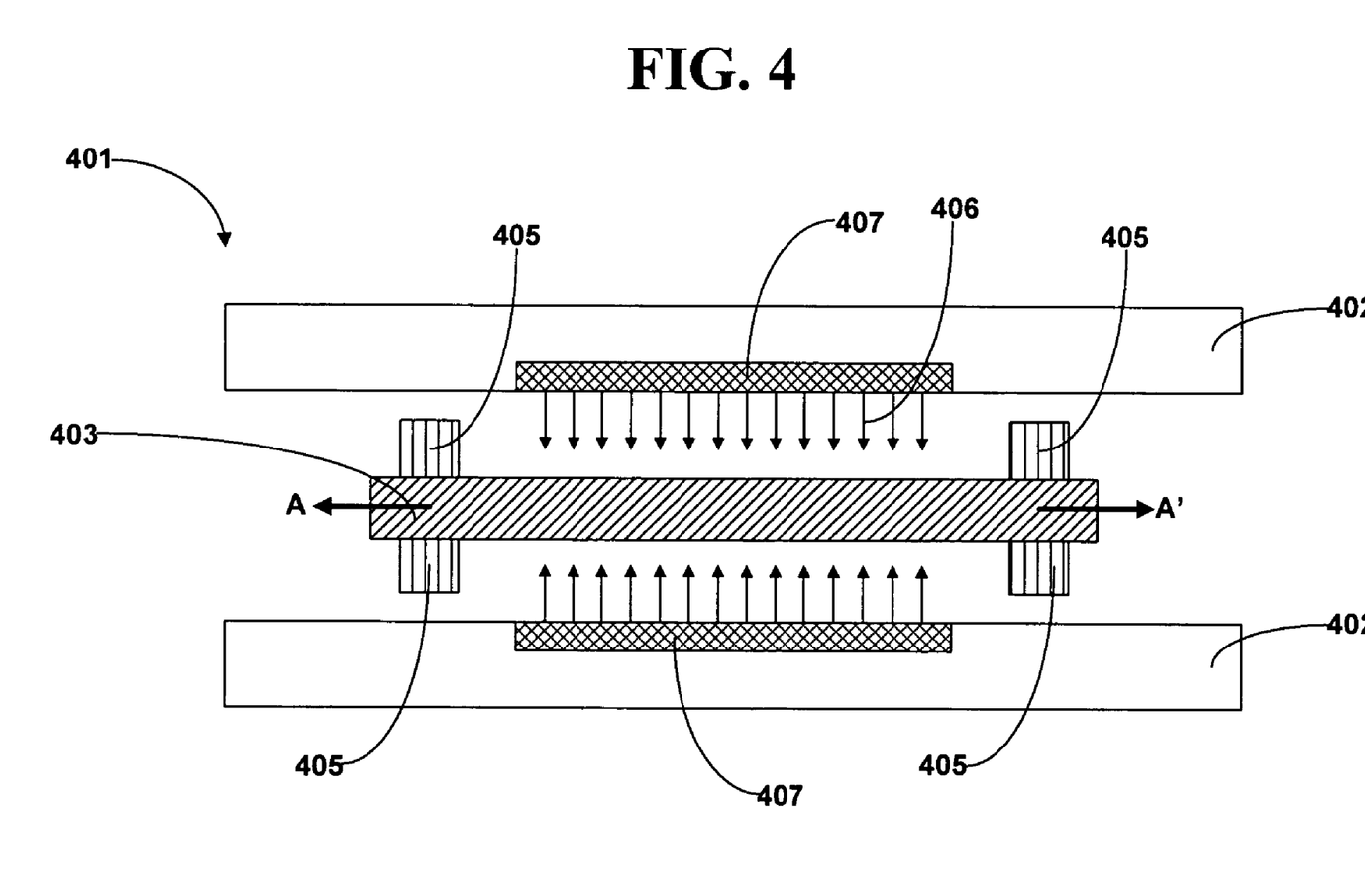
FIG. 4 is a schematic illustration of the cross-section of the sintering zone of an operating apparatus according to one embodiment of the present invention, when viewed from a direction substantially parallel to a main surface of the soot sheet being sintered.

In certain embodiments of the present invention, it is desired that the sintering is conducted in a manner such that the resulting sintered glass does not significantly sag due to, inter alia, gravity of the glass sheet. One way to avoid sagging due to gravity is to place the soot sheet in a substantially vertical position during sintering, i.e., the gravity force of the soot sheet is essentially parallel to a main surface of the sheet. Of course, slight deviation from the exact vertical position, e.g., by ±15°, in certain embodiments by ±10°, in certain other embodiments by ±5°, is allowed, and should be considered within the meaning of "substantially vertical." Another way for alleviating sagging of the glass during sintering is to apply a tensile stress across the soot sheet and/or the glass sheet. Such tensile stress can be applied by the soot-sheet-guiding devices, such as clamping rollers (111, 113, 405) and/or clamping conveyor belts. Typically, during the sintering process, because of the consolidation of the structure of the soot sheet, the density of the soot sheet increases as the sintering progresses. If no tensile stress is applied across the soot sheet, the sheet would shrink. Thus the application of tensile stress to the soot sheet during sintering can also lead to the thinning of soot sheet, especially where the tensile stress is applied via clamping guiding devices having essentially constant distances between them throughout the sintering zone (401). If tensile stress is applied to the soot sheet during sintering, the soot sheet can be placed in a substantially horizontal position, a substantially vertical position as described above, or a slant position in the middle of these two positions. The tensile stress can counter the effect of gravity in preventing sagging of the soot sheet and/or glass sheet during sintering.

In certain embodiments, it is highly desired that at least a majority of the glass sheet as a result of the sintering of the soot sheet has a high surface quality in the main surfaces: low surface waviness; low surface roughness; and essentially free of scratches. Such high surface quality are particularly advantageous for, e.g., LCD display substrates. Several approaches may be adopted to obtain one or more of the attributes of the high-quality surface noted above. For example, to that end, it is desirable to sinter the soot sheet with a majority (50%, in certain embodiments at least 60%, in certain other embodiments at least 70%, in certain other embodiments at least 80%, in certain embodiments at least 90%, in certain other embodiments at least 95%, in certain other embodiments at least 98%), of at least one (in certain embodiments both) major surfaces exposed to a gas or vacuum without directly contacting a solid object. It is believed that sintering while maintaining a major surface exposed to gas or vacuum can heal part of the surface defects, if any, on the soot sheet surface and create a glass sheet having one or more of the attributes of a high-quality surface noted above. Thus, in certain embodiments, it is desired that during sintering, the movement of the soot sheet is guided by the soot-sheet-guiding devices (111, 113, 405) discussed supra, where soot-sheet-guiding devices are allowed to contact substantially only the peripheral portion of a main surface. Further, surface quality of a sintered glass can be affected by contaminants, such as ambient particles, introduced onto the surfaces of the soot sheet. Thus, sintering in a clean environment, such as a clean room, can help improve the quality of the surface of the sintered glass sheet.

Various heating source can be used to heat the soot sheet to the sintering temperature. Electrical resistive heating and induction heating can be advantageously employed, because both do not alter the composition of the ambient atmosphere, and the ambient atmosphere can be separately and independently tailored to meet the needs of the production of various glass materials. The thermal history of the soot sheet and the glass sheet during sintering can affect the thickness of the final densified glass, the composition of the glass, composition homogeneity of the final glass, and physical property homogeneity of the final glass (such as refractive index, birefringence, and the like). Thus, where homogeneous composition and/or properties are desired for the sintered glass, it is desired that the soot sheet, or a part thereof, subjected to sintering is subjected to a substantially uniform sintering temperature during the sintering step. Induction heating and electrical resistive heating can be advantageously used for obtaining a substantially uniform sintering temperature. In certain embodiments, as shown in FIGS. 1 and 4, it is highly desired that the soot sheet is being heated from both sides of the main surfaces.

In certain embodiments, the heating chamber in which the sintering takes place is filled with an inert gas, such as $N_2$, Ar, Ne, mixtures thereof, and the like, to improve heat transfer and to prevent oxidation of the component of the apparatus and/or the glass material.

While the sintering step is carried out, the soot sheet may be held stationery inside the sintering zone in certain embodiments, especially if the soot sheet is a discreet soot sheet being sintered in its entirety. Where the soot sheet is too large for the sintering zone to be sintered in its entirety all at the same time, the soot sheet may be sintered in a step and repeat manner, i.e., a part of the soot sheet is sintered first, followed by another part thereof. In certain other embodiments of the present invention, especially in those continuous processes involving step (D), in particular those involving concurrent implementation of steps (B) and (D), the soot sheet may be allowed to pass the sintering zone successively, such that a sequential sintering of the soot sheet can be performed, allowing for continuous production of sintered glass.

FIG. 4 schematically illustrates the cross-section of a sintering zone 401 of an apparatus according to one embodiment of the present invention. Soot sheet 403 is held in place and tensioned by clamping soot-sheet-guiding rollers 405. Arrows A and A' illustrate the direction of forces that the rollers 405 exert on the main surfaces of the soot sheet during sintering. Heating elements 407, such as resistive heating elements or susceptors of induction heaters, located in the enclosures of the sintering zone, 402, are brought to an elevated temperature. The soot sheet is heated to the sintering temperature by irradiation 406 emitted by the heating elements and/or by the gas heated by the heating elements to the sintering temperature. Due to the tensioning of the rollers 405, sagging of the soot sheet is essentially avoided or eliminated.

Once the soot sheet, or a part thereof, is sintered into densified glass sheet, the densified glass sheet may be severed into discreet pieces by a cutting device. Various cutting devices and methods can be used for severing the glass sheet. In certain embodiments, laser cutting is particularly advantageous. Such separate consolidated glass pieces may be used as they are, or subjected to further post-formation processing, such as edge removal, coating, polishing, and the like. Alternatively, in certain other embodiments of the present invention, a long ribbon of sintered glass sheet can be reeled by a reeling device into a roll of the glass sheet. Certain spacing materials, such as paper sheet, cloth, coating materials, and the like, can be inserted in between the adjacent glass surfaces in the roll to avoid direct contact therebetween. If during the sintering a peripheral portion of a main surface of the soot sheet the a is clamped, it is quite likely that the peripheral portion is not sintered into densified glass at the end of the sintering step, or, even if it is sintered as well, the peripheral portion tends to have a differing thickness and/or surface quality than the center portion of the glass sheet which was free from contact with solid object during sintering. Therefore, in those embodiments, if the glass sheet is to be reeled into a roll, it is desirable that the edge portion is removed before the glass sheet is reeled into a roll. Various cutting devices and methods can be used for edge removal. In certain embodiments, laser cutting is particularly advantageous.

In certain embodiments, a protective coating is applied to at least one of the main surfaces of the glass sheet if the sheet needs to be shipped to a different location for further processing and/or downstream use. Such coating can be advantageous for long glass sheets to be reeled into a roll. Glass ribbons are advantageously coated on both sides before they are reeled into a roll.

Figure 5:
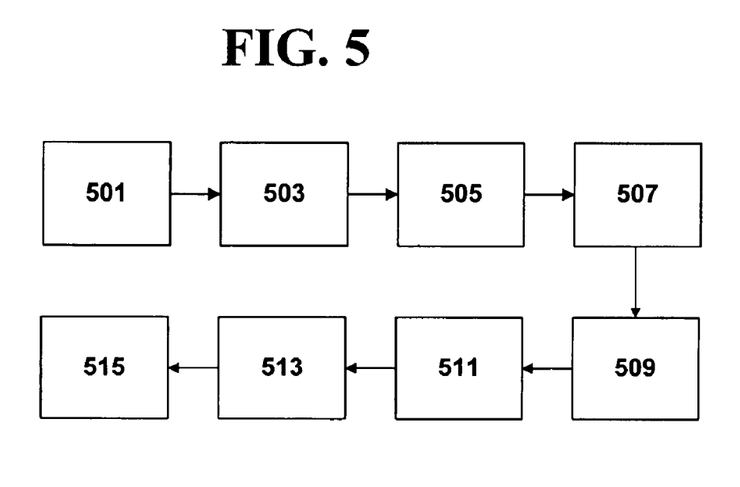
FIG. 5 is a flow chart schematically illustrating the process of making a glass sheet according to one embodiment of the present invention.

FIG. 5 is a flow chart schematically illustrating a continuous process of one embodiment of the present invention. The reference numerals in this figure have the following meaning:

501: providing soot particles;
503: depositing the soot particles on the deposition surface of a rotating drum to form a soot sheet;
505: releasing the soot sheet from the deposition surface;
507: transferring the soot sheet away from the deposition surface into a soot sheet sintering zone;
509: subjecting part of the soot sheet to sintering temperature such that the sintered part is converted into densified glass;
511: removing the edges of the glass sheet;
513: application of a protective coating on the main surfaces of the glass sheet; and
515: reeling the thin, flexible glass sheet into a roll of glass sheet material.

The embodiment of the apparatus illustrated in FIG. 1 has three zones: soot deposition and releasing zone 191; sintering zone 193 and reeling zone 195. In the heating zone 193, heat 115 is applied to the soot sheet to heat the soot sheet to sintering temperature. In the reeling zone, the sintered glass sheet is reeled into a roll 117.

As described supra, the process and apparatus of the present invention are particularly suitable for making soot sheet and sintered glass sheet comprising high percentage of silica, e.g., silica glass comprising at least 90%, in certain embodiments at least 95%, in certain embodiments at least 98%, or even at least 99% in certain embodiments, by weight of $SiO_2$. Teachings in the prior art regarding flame hydrolysis for making silica glass can be adapted for use in the present invention by one skilled in the art upon reading the present text.

Flexible sintered glass sheets such as long glass ribbons can be made according to certain embodiments of the present invention. Glass sheets having a thickness of 10 µm, 30 µm, 50 µm, 100 µm can be made. In certain embodiments of the present invention, the sintered glass sheet has a thickness ranging from 10 µm to 300 µm, in certain embodiments from 10 µm to 200 µm, in certain embodiments from 20 µm to 300 µm, in certain embodiments from 20 µm to 200 µm, in certain embodiments from 30 µm to 300 µm, in certain embodiments from 30 µm to 200 µm, in certain other embodiments from 50 µm to 200 µm. The thinner the glass, the higher the flexibility thereof assuming perfect glass surface. Nonetheless, a thickness of ranging from 10 to 100 µm can offer a good compromise between handling and flexibility. Thin, flexible glass sheets can find many useful applications.

The following non-limiting examples further illustrate the present invention.

EXAMPLES

Example 1

Fabrication of a Single-Layer Soot Sheet

A layer of at least 99% by weight silica was produced in an apparatus according to the present invention. Five linear burners, each 1 inch wide, were mounted on a burner manifold. These burners were placed in a line, next to each other, to produce a uniform, 5 inch wide soot stream. The gasses flowed through the burners included: approximately 5 grams/minute OMCTS carried by 20 SLPM of $N_2$ carrier gas in the centerline orifices of the burners. These gasses were surrounded along their length on both sides by a row of $O_2$ orifices that provided approximately 5 SLPM of $O_2$. Outside of these gasses were 2 more rows of orifices providing an additional 20 SLPM of $O_2$. The final row of orifices, outside of the two, provided a flame to ignite the OMCTS. The flow rates were 12 SLPM of $CH_4$ and 10 SLPM of $O_2$.

The burners were positioned approximately 4 inches from the deposition target. The target was a cylindrical quartz drum of 15 inches diameter. The drum had a wall thickness of 0.25 inches. The drum was rotated to provide a surface speed of 1 mm/sec. The soot from the linear array of burners was directed to the drum and a layer of soot approximately 200 microns thick and 6 inches wide was deposited on the drum. The extra inch of soot sheet width was due to flow of the particles along the drum surface). The average density of the soot sheet in the 5 inch wide length of the burners was approximately 1.1 g/cc. The soot outside of this length had a lower density, as it was not in the direct deposition zone of the burners. The 5 inch wide soot sheet created at the higher density was released from the drum, augmented by a stream of air supplied by an airknife. The airknife supplied approximately 20 SLPM of air through a 10 inch wide airknife body, directed at the drum. Besides helping to release the soot, the airknife kept the drum temperature uniform and cool, at about 200° C. The 5 inch wide soot sheet was manually grabbed by the peripheral edges and directed to a wind drum. The drum was approximately 6 inches in diameter. Five meters of soot sheet were wound onto the drum before the experiment was ended.

Example 2

Sintering of a Single-Layer Soot Sheet

A soot sheet, as described above in Example 1 but with a thickness of 60 microns was fabricated. Three of the above described burners were used in the burner array. The thickness was decreased by increasing the rotation speed of the drum and lowering the OMCTS flow rates. Thickness, density, and production rate of the soot sheet were changed by adjusting burner flow rates, drum rotation speed and distance from the burners to the drum.

A sample length, approximately 2 feet long and 3 inches wide, was taken for a sintering experiment. The peripheral edges of the soot sheet were pinned between rollers in contact along the length of the sample. A heat source was provided to sinter the soot sheet. The temperature of the soot reached approximately 1500° C. and the soot sheet densified to clear, sintered glass. The sintered glass was approximately 30 microns thick.

The sintered sheet with un-sintered peripheral edges was removed from the gripping mechanism and the edges were trimmed off. A 5 watt laser was used to trim the un-sintered soot from the sintered sheet. The laser was traversed at approximately 3 mm/s along the length of the sheet. Both sides were trimmed off in turn, although 2 lasers could have been employed at the same time.

It will be apparent to those skilled in the art that various modifications and alterations can be made to the present invention without departing from the scope and spirit of the invention. Thus, it is intended that the present invention cover the modifications and variations of this invention provided they come within the scope of the appended claims and their equivalents.

What is claimed is:

1. An apparatus for making a glass sheet, comprising:
   (I) a soot-providing device for providing glass soot particles;
   (II) a rotatable drum having an outer curved deposition surface on which the glass soot particles can be deposited to form a soot sheet;
   (III) a soot-sheet-releasing device for releasing at least part of the soot sheet from the outer deposition surface of the rotatable drum; and
   (IV) a soot-sheet-guiding device for guiding the movement of the part of soot sheet immediately released from the deposition surface away from the outer deposition surface of the rotatable drum in a length direction of the soot sheet and adapted to provide a tensile stress across a width of the soot sheet during sintering thereof, wherein the soot-sheet-guiding device comprises clamping conveyer belts.

2. An apparatus according to claim 1, wherein the soot-providing device (I) comprises a burner array.

3. An apparatus according to claim 1, wherein the rotatable drum (II) comprises a refractory material at least in the peripheral portion providing the outer deposition surface.

4. An apparatus according to claim 1, wherein the soot-sheet-releasing device (III) comprises a gas jet.

5. An apparatus according to claim 1, wherein the soot-guiding-device is positioned to be in direct contact substantially only with a peripheral portion of the soot sheet.

6. An apparatus according to claim 1, further comprising:
   (IV-1) a soot-sheet cuffing device for severing part of the soot sheet.

7. An apparatus according to claim 1, further comprising:
   (IV-2) a soot-sheet reeling device for forming the soot sheet into a roll.

8. An apparatus according to claim 1, further comprising:
   (V) a soot-sheet-sintering device for sintering at least part of the soot sheet to densified glass sheet.

9. An apparatus according to claim 8, wherein the soot-sheet-sintering device comprises an induction heater.

10. An apparatus according to claim 8, wherein the soot-sheet-sintering device is oriented such that negligible sag is created by gravity to the soot sheet when the soot sheet is being heated.

11. An apparatus according to claim 1, further comprising:
    (VI) a glass-sheet cutting device for severing part of the glass sheet.

12. An apparatus according to claim 1, further comprising:
    (VII) a glass-sheet reeling device for forming the glass sheet into a roll.

13. A process for making a glass sheet, comprising the following steps:
    (A) providing a plurality of glass soot particles;
    (B) depositing the glass soot particles on a curved deposition surface of a rotating drum to form a soot sheet;
    (C) releasing at least part of the soot sheet from the deposition surface of the drum; and
    (E) sintering at least a part of the soot sheet into densified glass by heating the part of the moving soot sheet to a sintering temperature, wherein both sides of both peripheral portions of both main surfaces of the soot sheet being sintered are placed in contact with a sootsheet-guiding device, and the soot-sheet-guiding device applies a tensile stress across a width of the soot sheet during sintering.

14. A process according to claim 13, wherein, step (A) comprises generating a plurality of glass soot particles via a burner array.

15. A process according to claim 13, wherein in step (B), the soot sheet formed on the deposition surface has a substantially uniform thickness.

16. A process according to claim 13, wherein in step (B), the soot sheet formed on the deposition surface has an average thickness ranging from 50 to 400 µm.

17. A process according to claim 13, wherein in step (B), the rotating drum has a circular cylindrical deposition surface rotating about an axis, on which the glass particles are deposited.

18. A process according to claim 13, wherein in step (B), the soot sheet formed is essentially continuous.

19. A process according to claim 13, further comprising a step (D) after step (C):
  (D) moving the part of the soot sheet immediately released from the deposition surface away from the deposition surface as the drum is rotating and part of the soot sheet remains attached to the deposition surface.

20. A process according to claim 19, wherein step (D) is carried out while step (B) is carried out concurrently.

21. A process according to claim 19, wherein in step (D), the direction in which the soot sheet moves away from the deposition surface of the rotating drum where it is released is essentially tangential to the deposition surface.

22. A process according to claim 19, wherein in step (D), the movement of the soot sheet is guided by the soot-sheet-guiding device in contact with a main surface of the soot sheet.

23. A process according to claim 22, wherein in step (D), the soot-sheet-guiding device is placed in contact only with a peripheral portion of a main surface of the soot sheet.

24. A process according to claim 22, wherein in step (D), the soot-sheet-guiding device comprises multiple clamping rollers and/or clamping conveyor belts.

25. A process according to claim 13, wherein in step (C), a gas jet is directed to the location of the deposition surface where the soot sheet is released to aid the release of the soot sheet.

26. A process according to claim 13, further comprising the following step (EE):
  (EE) sintering only a part of the soot sheet into a densified glass sheet.

27. A process according to claim 26, wherein in step (EE), the densified glass after sintering has a thickness ranging from 10 to 100 µm.

28. A process according to claim 13, wherein in step (E), multiple parts of the soot sheet are subjected to sintering and the sintered parts form a continuous sheet of densified glass.

29. A process according to claim 28, further comprising the following step (FA):
  (FA) reeling the continuous sheet of densified glass into a roll.

30. A process according to claim 13, wherein in step (E), a majority of the main surface of the soot sheet being sintered is free from physical contact with a solid object during the sintering process.

31. A process according to claim 13, wherein in step (E), the part of the soot sheet being sintered is placed in a substantially vertical position.

32. A process according to claim 13, further comprising the following step (FF):
  (FF) reeling at least part of the soot sheet into a roll.

33. A process according to claim 13, further comprising the following step (FFF):
  (FFF) cutting the soot sheet to form a discrete soot sheet body.

34. A process according to claim 13, further comprising the following step (F):
  (F) reeling at least part of the sheet comprising densified glass into a roll.

35. A process according to claim 13, wherein step (A) comprises including dopants in the glass soot particles.

36. A process according to claim 13, wherein in step (B), the deposited soot sheet consists essentially of a single layer of glass particles, having essentially a homogeneous composition.

37. A process according to claim 13, wherein in step (B), the deposited soot sheet comprises at least two layers of glass particles, each having a composition differing from that of a contiguous layer.

38. A process according to claim 13, wherein in step (B), the deposited soot sheet consists essentially of a single layer of glass particles, having a low local soot density variation.

39. A process according to claim 13, wherein in step (B), the deposited soot sheet comprises at least two layers of glass particles, each having an average soot density differing from that of a contiguous layer.

40. A process according to claim 13, wherein in step (A), the glass soot particles comprise at least 90% by weight of silica.

41. A process according to claim 40, wherein step (A) comprises forming silica soot particles by flame hydrolysis.

42. A process according to claim 13, wherein the burners are maintained stationery relative to a rotation axis of the rotating drum.

43. A process according to claim 13, where the soot sheet has an unsintered thickness ranging from 10 to 100 µm.

44. An apparatus for making a glass sheet, comprising:
  (I) a soot-providing device for providing glass soot particles, the soot-providing device including a burner array comprising a linear array of burners;
  (II) a rotatable drum having an outer curved deposition surface on which the glass soot particles can be deposited to form a soot sheet;
  (III) a soot-sheet-releasing device for releasing at least part of the soot sheet from the outer deposition surface of the rotatable drum; and
  (IV) a soot-sheet-guiding device for guiding the movement of the part of soot sheet immediately released from the deposition surface away from the outer deposition surface of the rotatable drum, wherein the soot-sheet-guiding device comprises clamping conveyor belts capable of providing tensile stress across a width of the soot sheet when the soot sheet is sintered.

45. An apparatus according to claim 44, wherein the burner array comprises at least three burners.

46. An apparatus according to claim 44, wherein the linear array comprises a plurality of linear burners and each linear burner comprises a linear array of gas orifices.

47. A process for making a glass sheet, comprising the following steps:
- (A) providing a plurality of glass soot particles;
- (B) depositing the glass soot particles on a curved deposition surface of a rotating drum using a linear array of burners to form a soot sheet;
- (C) releasing at least part of the soot sheet from the deposition surface of the drum; and
- (E) sintering at least a part of the soot sheet into densified glass by heating the part of the moving soot sheet to a sintering temperature, wherein both sides of both peripheral portions of both main surfaces of the soot sheet being sintered are placed in contact with a soot-sheet-guiding device, and the soot-sheet-guiding device applies a tensile stress across a width of the soot sheet during sintering.

48. A process according to claim 47, wherein the linear array comprises a plurality of linear burners and each linear burner comprises a linear array of gas orifices.

* * * * *